No. 709,745. Patented Sept. 23, 1902.
A. W. CHASE.
PROCESS OF TREATING ORES AND BY-PRODUCTS CONTAINING SULFUR AND IRON.
(Application filed Mar. 4, 1899.)
(No Model.)
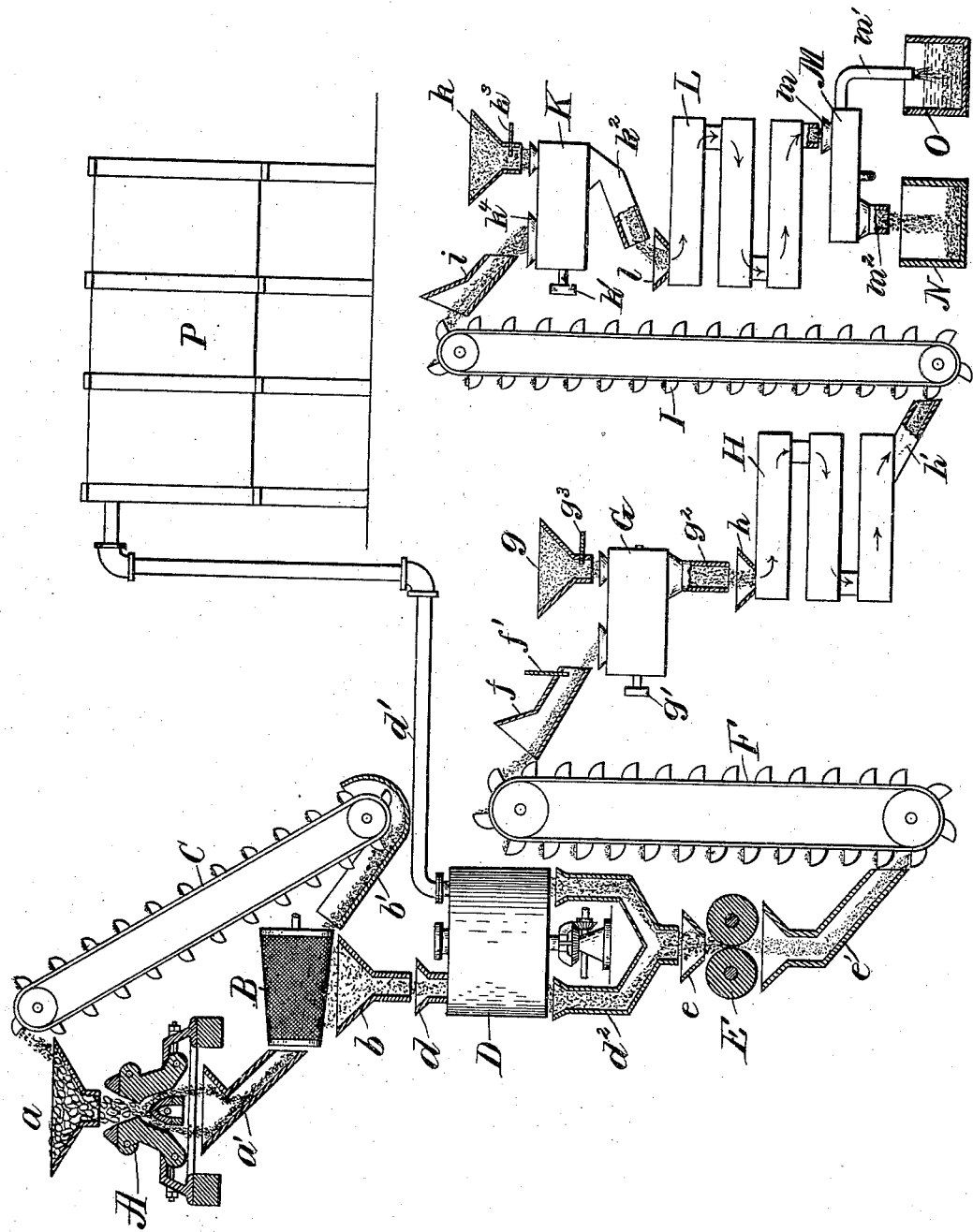
Witnesses
John H. Holt
J. Stephen Giusta
Inventor
A. W. Chase.
By Wilkinson & Fisher
Attorneys.

UNITED STATES PATENT OFFICE.

ARTHUR W. CHASE, OF AVOCA, IOWA.

PROCESS OF TREATING ORES AND BY-PRODUCTS CONTAINING SULFUR AND IRON.

SPECIFICATION forming part of Letters Patent No. 709,745, dated September 23, 1902.

Application filed March 4, 1899. Serial No. 707,773. (No specimens.)

*To all whom it may concern:*

Be it known that I, ARTHUR W. CHASE, a citizen of the United States, residing at Avoca, in the county of Pottawattamie and State of Iowa, have invented certain new and useful Improvements in Processes for the Treatment of Ores and By-Products Containing Sulfur and Iron; and I do hereby declare the following to be a full, clear, and exact description of the invention, such as will enable others skilled in the art to which it appertains to make and use the same.

My invention relates to improvements in the processes of treating sulfuret ores containing iron and the ash of said ores obtained as a by-product in sulfuric-acid making.

The ore which my process is designed especially to treat is a pyrrhotite or mundic ore obtained in Virginia. An analysis of an average sample of this ore is as follows: silica, 3.40 per cent.; alumina, 3.81 per cent.; iron, 51.65 per cent.; lime, 1.80 per cent.; magnesia, .85 per cent.; sulfur, 33.37 per cent.; copper, 1.22 per cent.; lead, .27 per cent.; zinc, .54 per cent.; oxygen and undetermined, 3.09 per cent.; total, one hundred. On account of the difficulty of treating this ore it has been prior to my invention considered as practically worthless. It has been heretofore found impossible to utilize the iron contained therein, and the percentage of sulfur is small compared with that in the ores commonly used for sulfuric-acid making. The percentage of copper is obviously too small to make the ore worth treating for copper alone, and the same is true of the lead and zinc. Obviously the other ingredients—silica, alumina, lime, and magnesia—are commercially worthless. Another objection to this ore which prevents it from being of any particular value, even in sulfuric-acid making, is that it contains five strong basic elements which tend to hold the sulfur—namely, lime, magnesia, copper, lead, and zinc. The presence of these elements prevents to a large degree the sulfur from being eliminated from the ores in roasting for sulfuric acid. Consequently, as said before, this ore has been considered practically worthless; but treated by my process, as hereinafter described, it is a valuable ore. It would of course naturally be expected that if a process could treat this highly-refractory ore in a practical and satisfactory manner or if it would so treat the ash therefrom after roasting as in the sulfuric-acid process such process would also be valuable in the treatment of other ores less refractory in nature containing sulfur and iron with various commercially-useless materials—such as silica, alumina, &c.—whether said ores or ash contain copper or not, and by actual trial it is found that this is a fact.

The recovery of the iron from the specific ore above mentioned constitutes the chief value of my process for such ore, although the value of the by-products, such as sulfuric acid and copper, is also considerable, and some ores of this character carry small but appreciable quantities of gold and silver, and if these are present the recovery of them by well-known methods also adds to the value of the ore. The first step in the treatment of this highly-refractory ore is to get rid of the sulfur. Of course part of this sulfur can be gotten rid of by an ordinary roasting operation in any roasting-furnace of an approved type. Repeated and long-extended trials, however, show that it is utterly impossible by any such operation, no matter how carefully conducted, to get rid of all the sulfur therein. Indeed, the ordinary roasting will only eliminate about ninety per cent. of the sulfur contained in this particular ore, even when conducted with great care and with the ore finely divided, and it is absolutely essential for the success of the process as a whole that almost all of the sulfur should be removed before a smelting operation is attempted for the purpose of obtaining the iron. The main feature of my process is therefore the complete extraction of the sulfur from the ore. After this comes the extraction of the copper and then the smelting of the residue to obtain the iron, and silver or gold, if present, being of course recovered in the usual way.

My process, generally considered, consists in the following steps: first, pulverizing the ore; second, roasting the ore; third, pulverizing the roasted ore, if necessary; fourth, mixing with said roasted ore a small percentage of pulverized coke, charcoal, or other carbonaceous material; fifth, roasting the mixture; sixth, pulverizing the roasted product, if necessary; seventh, mixing said pulverized product with a small portion of common salt; eighth, roasting; ninth, lixiviating the roasted product, and, finally, treating the solution thus obtained in any of the well-known ways for the recovery of copper, if any is present, and treating the solid residue in any well-known way for the recovery of the iron.

The roasting with carbonaceous material, which is the second roasting operation, is an important step in my process, and indeed in case of highly-refractory ores it is indispensable. The preliminary roasting (for sulfuric-acid making) removes, if carefully conducted, about ninety per cent. of the sulfur present, including a large proportion of the sulfur which is chemically combined with the iron. Only a very small part, however, of the sulfur which is combined with the lime, magnesia, lead, and zinc of the ore is eliminated in this preliminary roasting. This renders necessary the second roasting operation, in which carbon is used and in which the mixed carbon and ash is roasted at a full-red heat and with free access of air. This second roasting operation decomposes practically all the sulfates present, some of these being present in the crude ore and others being formed as a result of the first roasting. The insoluble sulfates of lime and lead, as well as the soluble sulfates of magnesia and zinc, are alike decomposed. The lead and zinc are oxidized and pass off in fumes. The sulfates of lime and magnesia (and also any other sulfates of the metals of the alkalies or of the alkaline earths, if any are present) are changed to sulfids, which are soluble. This changing of insoluble salts containing sulfur to soluble salts is an important feature of my process. By this second roasting nearly all of the sulfur is eliminated from the ore, and the sulfur which remains in the ore is nearly all converted into soluble salts. The sulfur which remains in the ore and which is not converted into soluble salts, which residual part includes particles of the original ore, for instance, that have in some way escaped unaffected through the previous operations and which residual part in all cases contains only a very small part of the sulfur present in the crude ore, is practically gotten rid of in the final roasting with salt and in the subsequent lixiviation. By my process practically all of the sulfur is eliminated, analysis in numerous cases showing only a trace of sulfur remaining.

In the accompanying drawing the figure represents the general features of the apparatus used in carrying out my process.

$a$ represents a hopper, which delivers to a crusher A of any approved type. This crusher delivers to a chute $a'$, which in turn delivers into a revolving screen B. The ore that does not pass through this screen is delivered to the chute $b'$ and is returned by the elevator C into the hopper $a$, from whence it again passes into the crusher. The ore that passes through the screen B falls into the chute $b$ and thence into the hopper $d$, from whence it is delivered into a roasting-furnace D of any approved type. A pipe $d'$ conducts the gases evolved during this roasting operation into a sulfuric-acid chamber P. The ore after this roasting operation, which removes quite a large percentage of the sulfur contained in the ore, passes through the chutes $d^2$ into a hopper $e$ and thence between crushing-rolls E, from which it is delivered into the chute $e'$. An elevator F then delivers the crushed material to a chute $f$, provided with a valve $f'$, from whence the ore is delivered into a mixer G of any desired type. A hopper $g$, provided with a valve $g^3$, is arranged to deliver any carbonaceous matter, preferably coke-dust, into the mixer G. This mixer is provided with a shaft having a pulley $g'$, which may be revolved in any suitable way, and the shaft itself may be provided with any suitable stirring devices. The mixed ore and carbon then passes down the chute $g^2$ into the hopper $h$ and thence into the roasting-furnace H, which, as shown, contains three chambers with connections between them, and in each of these chambers the ore is mechanically stirred and fed forward. After passing through the roaster it falls into a chute $h'$, from whence it is taken by an elevator I and delivered to the chute $i$, falling from this chute into the hopper $k^4$ of a second mixer K, in which is mounted a shaft provided with a pulley $k'$. This mixer is also provided with a hopper $k$, which has a valve $k^3$ and which is adapted to contain common salt. The mixture of ore and salt is delivered by the chute $k^2$ to the hopper $l$ of a second roaster L, which is of the same construction as the roaster H. The roaster L delivers the ore into the hopper $m$ of a lixiviating vessel M, which is supplied with steam under pressure and hot water in any desired way. The water is discharged through the pipe $m'$ into a vessel O. This vessel acts as a precipitation-tank, and into this vessel will be discharged practically all of the copper, gold, and silver and other soluble salts contained in the roasted mixture, including the sulfids of lime and magnesia. The lead and zinc are vaporized in the roasting operations. The clean ore passes through the chute $m^2$ into the receptacle N, from whence it is taken, and after subjection to the action of a magnetic separator, if desired, the ore is briquetted for use in a blast-furnace or treated in any of the usual ways. Practically all of the iron contained in the ore will be discharged into the receptacle N, and it will contain nothing but this iron ore, with the exception of mechanical impurities, such as silica, alumina, and the other insoluble gangue of the ore.

In carrying out my process the ore or ash is finely crushed after a preliminary roasting in case ore is used and mixed with a percentage of coal-dust, coke, or other carbonaceous matter, but preferably coke-dust—a percentage calculated for the reduction of the sulfur until it is reduced so that it is slightly in excess of the copper present in the ore or ash. This percentage of course varies with the percentage of sulfur in the ore or ash and the presence or absence of alkalies, alkaline earths, &c.; but as much of the sulfur is expelled in roasting, as vapor of sulfur, sulfurous and sulfuric oxids, the percentage of carbon needed will usually be much less than the percentage of sulfur, and in the ordinary run of ash will be about three per cent. This mixture is roasted in the furnace shown. In this furnace the mixture is given a continuous and regular stirring, so that fresh surfaces of the ore are continually exposed to heated air or to fire-clay or iron at a red heat. The temperature is maintained at or slightly above a full-red heat, and the time of passing of the ore or ash through the furnace is that needed for the reduction of the sulfur to the desired point. As the percentage of carbon used, the furnace heat, and the time of roasting are all under control, the roasting can be regulated exactly as desired. The residue after this roasting is generally sufficiently fine and without "scars." If not, it is crushed and then mixed with a percentage of common salt, varying from one and one-half to two times that of the sulfur now present, and again passed through my furnace. The heat is now kept at about a dull red, and the time of passing through the furnace is so regulated that the copper is completely converted into a chlorid. The residue from this roasting is lixiviated, as in the well-known Henderson process, and the copper, together with the silver and gold present, if any, recovered by standard methods.

I do not claim the roasting with salt and subsequent lixiviation as broadly new; but I do claim the process as above outlined as applied to raw sulfuret ores and as applied to ash obtained from the roasters in sulfuric-acid making, where, as is generally the case, the sulfur is relatively much higher in percentage than the copper, and the amount of salt needed in the Henderson process is relatively much greater than by my process. The preliminary roasting of ash and sulfuret ores with an admixture of carbonaceous material reduces the amount of salt necessary in the subsequent roasting operation usually by one-half.

In applying my process to sulfuret ores or ash which do not contain any appreciable amount of copper I am able to roast the ore or ash with an admixture of carbonaceous material and obtain good iron practically free from sulfur without resorting to the secondary roasting with salt. By this method I have found in practice that I can reduce the sulfur present to a small fraction of one per cent., at times only a trace remaining. The iron oxids are then ready for treatment in a magnetic separator, if necessary, to separate them from silica and other insoluble impurities and for making into briquets for use in a blast-furnace.

The advantages of my process are that it is quick, inexpensive, and that it utilizes practically all the valuable constituents of the ore or ash, a thing which has never been done before up to the present time. The iron contained in the ash obtained in the process of making sulfuric acid has never been recovered except as a by-product in the Henderson process, and in the case of ores which do not contain copper (pyrite ores, for example) or in which the copper percentage is too low for profitable extraction by the Henderson process the iron has never been recovered.

Looking at the process as a whole, it is seen that under a red heat some sulfur passes off as $SO^2$, some as vapor of sulfur, (S,) some from the continued formation of sulfates from sulfids and the subsequent reduction of the sulfates to sulfids and oxids with evolution of vapor of sulfur $SO_2$ and $SO_3$. The sulfur is thus gradually reduced, and as my process involves the continual turning over of the ore, the latter being in a fine state of division, the cycle of changes from sulfids to sulfates or oxids and the evolution of sulfur in various forms is regularly continued at about the constant temperature of a full-red heat until the percentage of the sulfur is as low as is desired, such sulfur being almost entirely in a soluble form. Moreover, by mutual decomposition, due to the temperature and the presence of carbon, the percentages of cobalt and manganese are materially reduced or changed to soluble forms; that arsenic and phosphorus are volatilized at this high heat. It is also seen that zinc salts in the presence of carbon at a high temperature are reduced and that the zinc is vaporized. The process as a whole, therefore, has a constant tendency to remove the volatile constituents—such as sulfur, lead, and zinc—of the ore or ash either in vapor or as oxids, reducing the iron to the stable oxids, placing the residual sulfur in a soluble state, and leaving the copper, silver, and gold ready for a subsequent roasting with a minimum quantity of common salt for their recovery by a modification of the Henderson process.

Having thus described my invention, what I claim as new, and desire to secure by Letters Patent of the United States, is—

1. The process of treating materials of the character described, which consists in subjecting said ores or ash to the action of heat and a suitable reducing agent, whereby the iron is completely changed to an insoluble form, and whereby the sulfur is either volatilized or reduced to a soluble form, and leaching out the residual soluble sulfur salts, substantially as described.

2. The process of treating materials of the character described, which consists in mixing said ores or ash with carbonaceous material and roasting the mixture, whereby the iron is changed to insoluble oxids and the sulfur is either volatilized or changed to a soluble salt or salts, and leaching out the soluble salts, substantially as described.

3. The process of treating materials of the character described, which consists in pulverizing said ore or ash, mixing it with finely-divided carbonaceous material, heating the mixture to a full-red heat with free access of air, stirring the mixture during the roasting operation, whereby the iron is changed to insoluble oxids and the sulfur is either volatilized or changed to a soluble salt or salts, and leaching out the soluble salts, substantially as described.

4. The process of treating materials of the character described, which consists in mixing said ore or ash with carbonaceous material, roasting said mixture until the sulfur contained therein is reduced to a percentage equal to or slightly in excess of the copper contained in said ores or ash, mixing with the product a quantity of common salt chemically equivalent to the quantity of copper present, roasting this mixture and leaching out the soluble salts, substantially as described.

5. The process of treating materials of the character described, which consists in pulverizing said ores or ash, mixing them with finely-divided carbonaceous material, roasting said mixture at a full-red heat with free access of air, stirring said mixture during the roasting operation until the sulfur is reduced to a percentage equal to or slightly in excess of the copper present, mixing the product with a quantity of common salt chemically equivalent to the quantity of copper present, roasting said mixture at a dull-red heat, mechanically stirring the same, leaching out the soluble salts and treating the solution thus obtained and the residue by any of the well-known methods for the recovery of the valuable constituents thereof, substantially as described.

6. The process of treating materials of the character described, which consists in roasting them with the admission of a suitable quantity of air for the production of sulfuric acid, pulverizing the ash therefrom, mixing said pulverized product with a small percentage of finely-divided carbonaceous material, roasting said mixture at a full-red heat with free access of air, mechanically stirring said mixture during said roasting operation, mixing the roasted material with a quantity of common salt chemically equivalent to the copper present, roasting the mixture at a dull-red heat with free access of air, mechanically stirring said mixture during the roasting operation, subjecting the product to the action of hot water and steam under pressure, thereby forming a solution of all the soluble salts present, and treating the solution and residue by any of the well-known methods to obtain the valuable constituents thereof, substantially as described.

In testimony whereof I affix my signature in presence of two witnesses.

ARTHUR W. CHASE.

Witnesses:
J. STEPHEN GIUSTA,
JOHN H. HOLT.